(12) United States Patent
Hamilton, II (10) Patent No.: US 9,532,558 B2
(45) Date of Patent: Jan. 3, 2017

(54) POWER GENERATING FISHING REEL AND REMOTE CONTROL LURE SYSTEM

(71) Applicant: David Lee Hamilton, II, Chatsworth, GA (US)

(72) Inventor: David Lee Hamilton, II, Chatsworth, GA (US)

( * ) Notice: Subject to any disclaimer, the term of this patent is extended or adjusted under 35 U.S.C. 154(b) by 188 days.

(21) Appl. No.: 14/447,836

(22) Filed: Jul. 31, 2014

(65) Prior Publication Data
US 2015/0033611 A1 Feb. 5, 2015

Related U.S. Application Data

(60) Provisional application No. 61/958,611, filed on Aug. 1, 2013.

(51) Int. Cl.
| | |
|---|---|
| *A01K 89/00* | (2006.01) |
| *A01K 85/00* | (2006.01) |
| *A01K 97/00* | (2006.01) |
| *A01K 99/00* | (2006.01) |
| *F03G 5/06* | (2006.01) |
| *A01K 85/01* | (2006.01) |
| *A01K 87/00* | (2006.01) |
| *A01K 89/015* | (2006.01) |
| *A01K 91/02* | (2006.01) |

(52) U.S. Cl.
CPC ............ *A01K 97/00* (2013.01); *A01K 85/00* (2013.01); *A01K 85/01* (2013.01); *A01K 87/007* (2013.01); *A01K 89/00* (2013.01); *A01K 89/006* (2013.01); *A01K 89/015* (2013.01); *A01K 91/02* (2013.01); *A01K 99/00* (2013.01); *F03G 5/06* (2013.01)

(58) Field of Classification Search
CPC ........ A01K 99/00; A01K 97/00; A01K 79/00; A01K 85/00; A01K 87/007; A01K 89/00
USPC ........... 43/4, 26.1, 26.2, 20, 21, 25; 242/223
See application file for complete search history.

(56) References Cited

U.S. PATENT DOCUMENTS

| | | | | |
|---|---|---|---|---|
| 3,248,819 | A * | 5/1966 | Stealy ................. | A01K 89/012 242/225 |
| 3,351,300 | A * | 11/1967 | Nagy ................... | A01K 89/012 43/21 |
| 4,315,301 | A * | 2/1982 | Jimena ..................... | H02J 7/32 362/193 |
| 4,360,860 | A * | 11/1982 | Johnson ................. | F21L 13/06 320/123 |

(Continued)

*Primary Examiner* — Darren W Ark
(74) *Attorney, Agent, or Firm* — Dale J. Ream (57) ABSTRACT

A power generating fishing reel and remote control lure system includes a reel assembly coupled to a fishing rod having a spool rotatably movable to reel in/out fishing line. The reel assembly includes an electrical generator configured to generate current. A crank handle is operatively coupled to the spool and to the generator and configured to actuate the spool and generator, respectively. A rechargeable battery is electrically connected to the generator and configured to store current generated by the generator. The system includes a lure assembly remote from the reel assembly having a battery, a motor and a receiver configured to receive a signal and to energize the motor accordingly. The reel assembly includes a lure input device and transmitter configured to transfer a user input signal to the lure assembly. The system includes an emergency assembly having lights, sensors, and alarms related to safety, current generation, and recharging.

19 Claims, 9 Drawing Sheets

(56) References Cited

U.S. PATENT DOCUMENTS

| | | | | |
|---|---|---|---|---|
| 4,634,072 A * | 1/1987 | Stealy | A01K 89/012 | 43/21 |
| 4,701,835 A * | 10/1987 | Campagnuolo | F21L 13/06 | 320/162 |
| 4,940,194 A * | 7/1990 | Young | A01K 89/01555 | 242/223 |
| 5,086,581 A * | 2/1992 | Barra | A01K 91/02 | 43/26.1 |
| 5,293,712 A * | 3/1994 | Lo | A01K 91/02 | 43/26.1 |
| 5,309,664 A * | 5/1994 | Wright | A01K 91/02 | 43/26.1 |
| 5,412,896 A * | 5/1995 | Morgan | F21V 33/008 | 43/4 |
| 5,465,198 A * | 11/1995 | Kellogg | F21S 8/035 | 362/253 |
| 5,483,767 A * | 1/1996 | Langer | A01K 79/02 | 43/4 |
| 5,511,335 A * | 4/1996 | Langer | A01K 79/02 | 43/4 |
| 5,546,695 A * | 8/1996 | Langer | A01K 79/02 | 43/44.98 |
| 5,552,973 A * | 9/1996 | Hsu | F21L 13/06 | 310/50 |
| 5,581,930 A * | 12/1996 | Langer | A01K 79/02 | 43/17 |
| 5,749,533 A * | 5/1998 | Daniels | F16D 57/002 | 242/287 |
| 5,782,033 A * | 7/1998 | Park | A01K 97/125 | 43/4 |
| 5,839,817 A * | 11/1998 | Wei | F21L 13/06 | 320/107 |
| 5,880,532 A * | 3/1999 | Stopher | B60K 6/10 | 310/13 |
| 5,949,215 A * | 9/1999 | Takakura | H02J 7/14 | 320/107 |
| 6,012,665 A * | 1/2000 | Olona | A01K 89/012 | 43/21 |
| 6,045,076 A * | 4/2000 | Daniels | A01K 89/01555 | 242/287 |
| 6,389,732 B1 * | 5/2002 | Daniel | A01K 91/02 | 43/26.1 |
| 6,412,722 B1 * | 7/2002 | Kreuser | A01K 89/01555 | 242/288 |
| 6,520,105 B2 * | 2/2003 | Koda | A01K 91/02 | 43/26.1 |
| 6,973,999 B2 * | 12/2005 | Ikuta | A01K 89/01555 | 242/288 |
| 6,983,907 B2 * | 1/2006 | Ikuta | A01K 89/01555 | 242/288 |
| 7,019,492 B1 * | 3/2006 | Baker | H02J 7/0044 | 320/107 |
| 7,159,813 B2 * | 1/2007 | Ikuta | A01K 89/01555 | 242/288 |
| 7,188,793 B2 * | 3/2007 | Ikuta | A01K 89/01555 | 242/223 |
| 7,239,237 B2 * | 7/2007 | Hess | H04B 1/086 | 340/539.1 |
| 7,310,905 B2 * | 12/2007 | Merline | A01K 91/02 | 43/26.2 |
| 7,434,757 B2 * | 10/2008 | Beckham | A01K 89/0155 | 242/223 |
| 7,461,805 B2 * | 12/2008 | Ikuta | A01K 89/015 | 242/223 |
| 7,495,577 B2 * | 2/2009 | Yen | H02J 7/32 | 320/114 |
| 7,559,499 B2 * | 7/2009 | Nakagawa | A01K 89/015 | 242/246 |
| 7,648,096 B2 * | 1/2010 | Niitsuma | A01K 89/01555 | 242/286 |
| 7,669,360 B2 * | 3/2010 | Davidson | A01K 85/01 | 43/4 |
| 7,723,880 B2 * | 5/2010 | Dai | H02K 7/1861 | 310/41 |
| 7,819,353 B2 * | 10/2010 | Nakagawa | A01K 89/015 | 242/223 |
| 7,905,440 B2 * | 3/2011 | Ikuta | A01K 89/015 | 43/4 |
| 8,266,836 B2 * | 9/2012 | Ware | A01M 31/06 | 43/26.1 |
| 8,627,593 B1 * | 1/2014 | Schepp | A01K 93/00 | 43/26.1 |
| 9,099,892 B2 * | 8/2015 | Jakins | H02J 7/0044 | |
| 9,278,737 B2 * | 3/2016 | Freeman | B63B 35/14 | |
| 2004/0130156 A1 * | 7/2004 | Hartman | G05G 1/30 | 290/1 A |
| 2004/0204180 A1 * | 10/2004 | Liao | H02J 7/32 | 455/573 |
| 2005/0102883 A1 * | 5/2005 | Temes | A01K 93/00 | 43/26.1 |
| 2005/0111218 A1 * | 5/2005 | Lee | F21L 13/06 | 362/192 |
| 2007/0006516 A1 * | 1/2007 | LaCroix, Jr. | A01M 31/00 | 43/26.1 |
| 2008/0250691 A1 * | 10/2008 | Barnes | A01K 87/007 | 43/17.5 |
| 2011/0061287 A1 * | 3/2011 | Ogawa | A01K 85/01 | 43/26.2 |
| 2011/0278860 A1 * | 11/2011 | Lupinacci | A01K 87/007 | 290/1 R |
| 2014/0110517 A1 * | 4/2014 | Niitsuma | A01K 89/01555 | 242/288 |
| 2014/0183107 A1 * | 7/2014 | Meunier | C02F 9/005 | 210/90 |
| 2015/0101235 A1 * | 4/2015 | Ogawa | A01K 85/01 | 43/4.5 |
| 2016/0007581 A1 * | 1/2016 | Davidson | A01K 85/02 | 43/17.1 |

* cited by examiner

POWER GENERATING FISHING REEL AND REMOTE CONTROL LURE SYSTEM

REFERENCE TO RELATED APPLICATION

This non-provisional patent application claims the benefit of provisional application Ser. No. 61/958,611 filed on Aug. 1, 2013, titled "Bobber Botz Bobber Lure, Remote Control Rod and Reel and Fishing Lure/Bobber."

BACKGROUND OF THE INVENTION

The present invention relates generally to fishing equipment and, more particularly, to a system having a fishing reel that generates electrical current as a hand crank handle of the reel assembly is actuated, having a remote control fishing lure, and having safety tools including sensors, alarms, and charging components.

During the course of fishing with a fishing lure and rod and reel, a fishing lure can move only in the direction that it is pulled by the fishing line to the reel. This limits the ability for the lure to travel along a path in a different direction of the person fishing. Further, fishing rods and reels typically do not have a means to produce electrical power for electronic devices such as I-phones, cameras, radios, and the like. This is a real problem for people who enjoy extended stays camping and fishing and have no means to recharge their electronic devices while away from traditional power sources. In addition, safety is another issue of concern for the extended stay fisherman or woman both from wildlife threats and human threats.

Therefore, it would be desirable to have a system that includes a reel assembly that generates electrical current as the hand crank handle of the reel assembly is actuated, a lure assembly having motors controlled by remote control, and a safety tool assembly having components for sensing danger and sounding an alarm.

SUMMARY OF THE INVENTION

A power generating fishing reel and remote control lure system for use with a fishing rod having a handle according to the present invention includes a reel assembly having a reel housing coupled to the handle of the fishing rod defining an interior area, the reel assembly including a spool rotatably situated in the interior area of the reel housing and configured to hold a fishing line, the spool being rotatably movable to reel in or reel out the fishing line. The reel assembly includes an electrical generator positioned in the interior area of the housing and configured to generate electrical current when actuated. A hand crank handle is operatively coupled to the spool and configured to selectively actuate movement of the spool when operated, the hand crank handle operatively coupled to the electrical generator and configured to actuate the electrical generator when operated. A rechargeable battery is situated in the interior area of the housing and electrically connected to the electric generator, the battery configured to store current generated by the electrical generator.

The power generating fishing reel and remote control lure system includes a lure assembly remote from the reel assembly that includes a battery, at least one motor electrically connected to the battery and a receiver configured to receive a signal and to selectively energize the motor according to the signal. The reel assembly includes a lure input device and a transmitter configured to transfer a user input signal to the lure assembly.

Therefore, a general object of this invention is to provide a fishing reel assembly having an electrical generator configured to generate electrical current as the hand crank handle of the reel assembly is actuated.

Another object of this invention is to provide a fishing reel assembly, as aforesaid, which can be accessed to recharge electronic devices.

Still another object of this invention is to provide a fishing lure having one or more motors that can be controlled by the reel assembly.

Yet another object of this invention is to provide a fishing lure, as aforesaid, that is battery powered and solar charged and has a receiver for receiving control signals from the reel assembly.

A further object of this invention is to provide a safety assembly for use with the reel and lure assemblies that includes sensors, alarms, and means for charging other electronic devices.

A still further object of this invention is to provide the assemblies discussed above that is useful with a traditional rod and reel apparatus.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A power generating fishing reel and remote control lure system according to a preferred embodiment of the present invention will now be described with reference to FIGS. 1 to 9 of the accompanying drawings. The fishing reel and remote control lure system 10 is for use with a fishing rod 12 of a type having a handle 14 and an elongate rod portion 16 extending away from the handle 14. The system 10 includes a reel assembly 20, a lure assembly 50 remote from the reel assembly 20, and a safety tool assembly 70.

Figure 3:
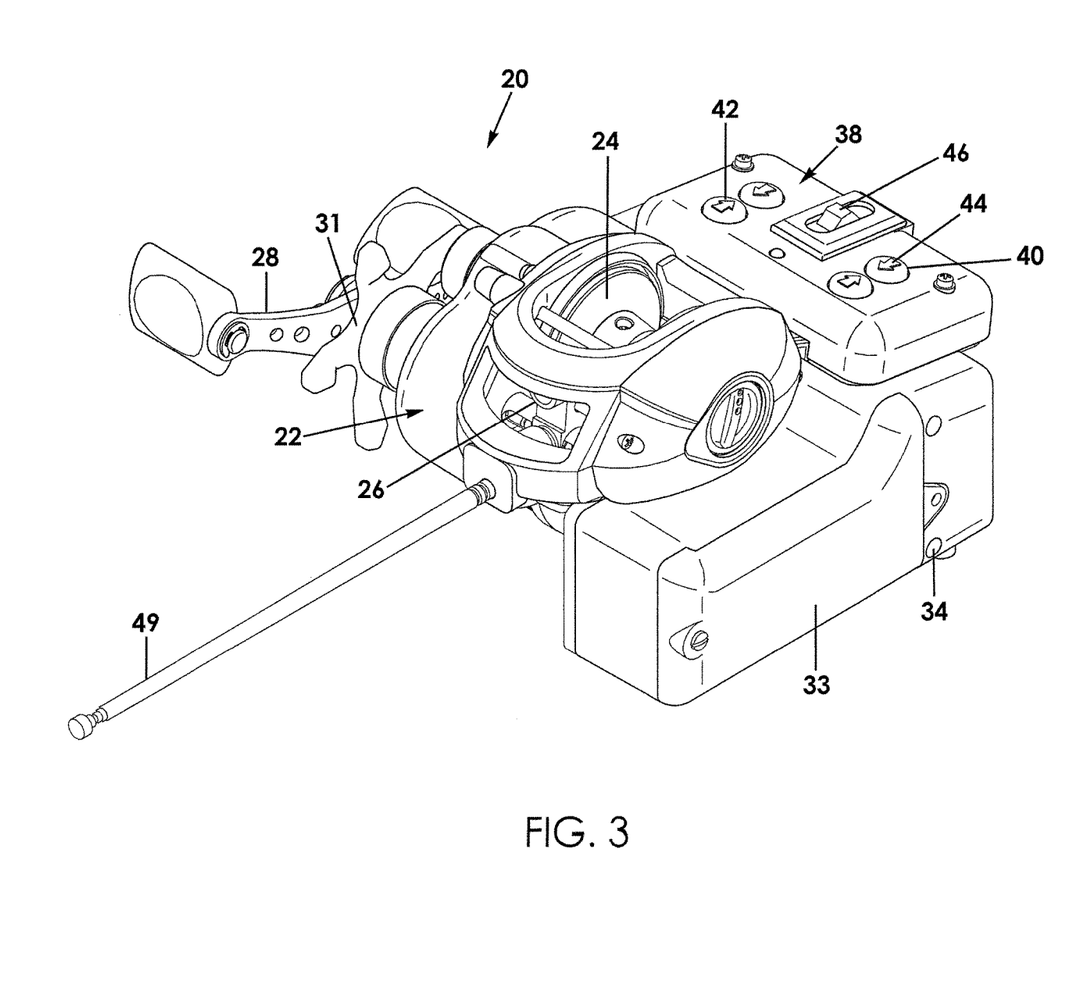
FIG. 3 is a front perspective view on an enlarged scale of a reel assembly removed from the system of FIG. 1.

The reel assembly 20 includes a reel housing 22 defining an interior area and a spool 24 rotatably situated therein, the spool 24 being configured to hold a fishing line 18 in a traditional manner (FIG. 3). The reel housing 22 has a front wall that defines an aperture 26 configured to receive the fishing line therethrough. It is understood that the mechanism for receiving the fishing line 18 onto the spool 24 may slide laterally back and forth to evenly place the line 18 on the spool 24. A hand crank handle 28 is operatively coupled to the spool 24 such that the spool 24 rotates to reel the fishing line onto the spool 24 when the crank handle 28 is operated.

The reel housing 22 is coupled to the handle 14 of the rod 12 and, in an embodiment, is releasably coupled thereto. The reel assembly 20 includes a star wheel-drag adjustment device 31 configured to adjust line drag resistance while fishing and also acts as a means to engage and disengage an internal clutch/slip so that the generator may be used while the fishing line is spooled on the spool and while the spool isn't operable (clutch disengaged). In other words, the clutch/slip is situated intermediate the generator and the spool (and is operatively connected to both) and configured to selectively engage or disengage the spool when the handle is operated to actuate the generator. This configuration enables the generator 30 to be used without casting the line or operating the spool and is also to adjust the drag resistance during fishing operation.

An electric generator 30 is positioned in the interior area of the reel housing 22. The electrical generator 30 is configured to generate electrical current when it is actuated. In that regard, the crank handle 28 is operatively coupled to the electrical generator 30 so as to actuate the electrical generator 30 to generate electrical current when the crank handle 28 is rotated. Importantly, the crank handle 28 is coupled to both the spool 24 and the electrical generator 30 situated within the reel housing 22 when the clutch is engaged by use of the star-wheel drag adjustment 31 such that electricity is generated while a user is actuating the hand crank handle 28 while an internal clutch is engaged by use of the star-wheel drag adjustment device 31.

A rechargeable battery 32 is situated in the interior area of the reel housing 22 of the reel assembly 20. The rechargeable battery 32 is electrically connected to the electrical generator 30 (FIG. 8) and configured to receive and store the electrical current generated thereby. The rechargeable battery 32 may be accessed through the battery panel 33 (FIG. 3). It is understood that there may be other circuitry included in the product design that is not described here. The rechargeable battery 32 may also be electrically connected to other components of the reel assembly 20 as will be described below.

A flash jack charging port 34 is situated in the reel housing 22 and is accessible through a wall thereof. The flash jack charging port 34 is configured to receive an associated flash jack input or plug as will be described later. The flash jack charging port 34 is electrically connected to the rechargeable battery 30 (FIG. 8) such that current stored in the rechargeable battery 30 may be transferred to an appropriate electronic device plugged into the port 34. Electronic devices compatible with the flash jack charging port 34 may include USB devices such as headphones, mp3 music players, and the like.

Figure 8:
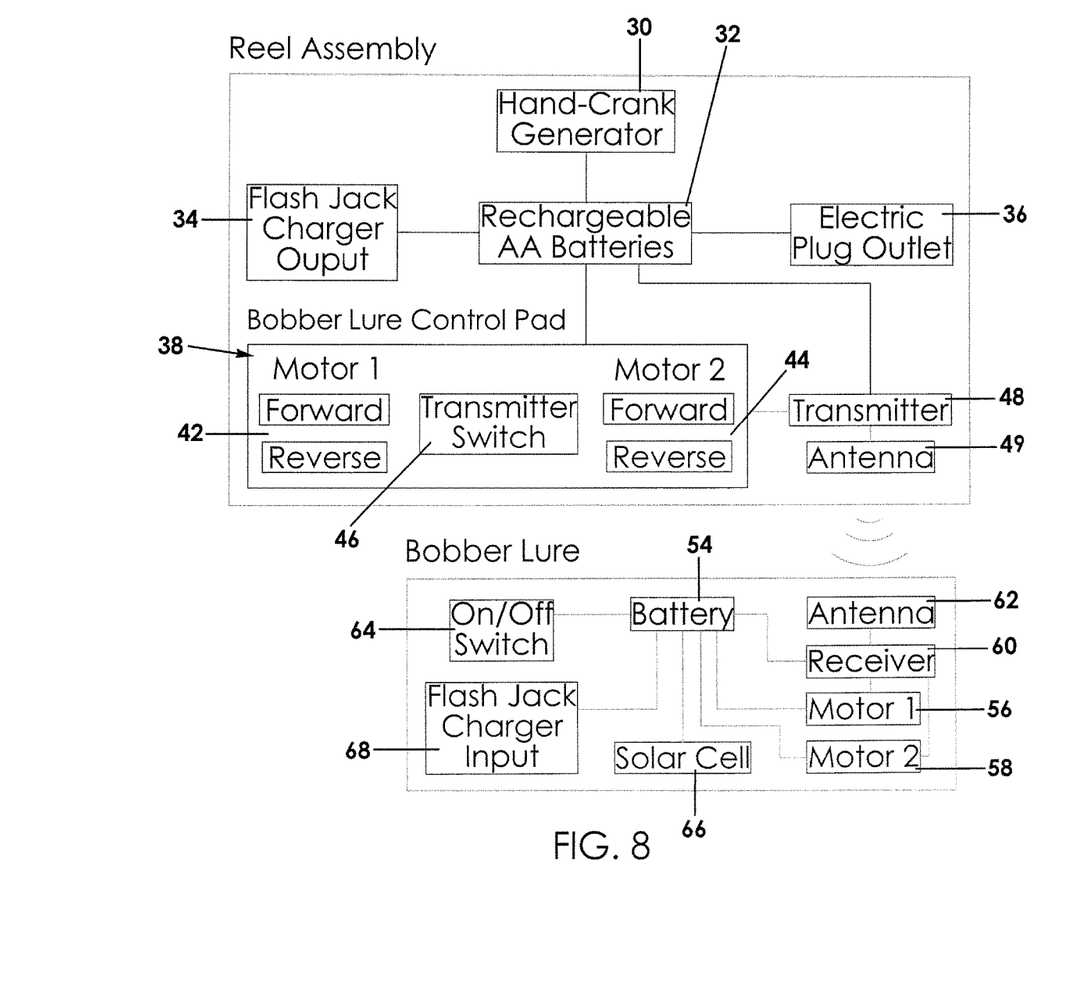
FIG. 8 is a block diagram illustrating the electronic components of the reel assembly and lure assembly.

Similarly, an electric plug outlet 36 is situated in the reel housing 22 and is configured to receive a standard AC power plug. The electric plug outlet 36 is operatively electrically connected to the generator 30 (FIG. 8). Accordingly, the reel assembly 20 may include circuitry that enables AC current devices to receive power from the generator 20 of the reel assembly 20 by way of the electric plug outlet 36.

Figure 5:
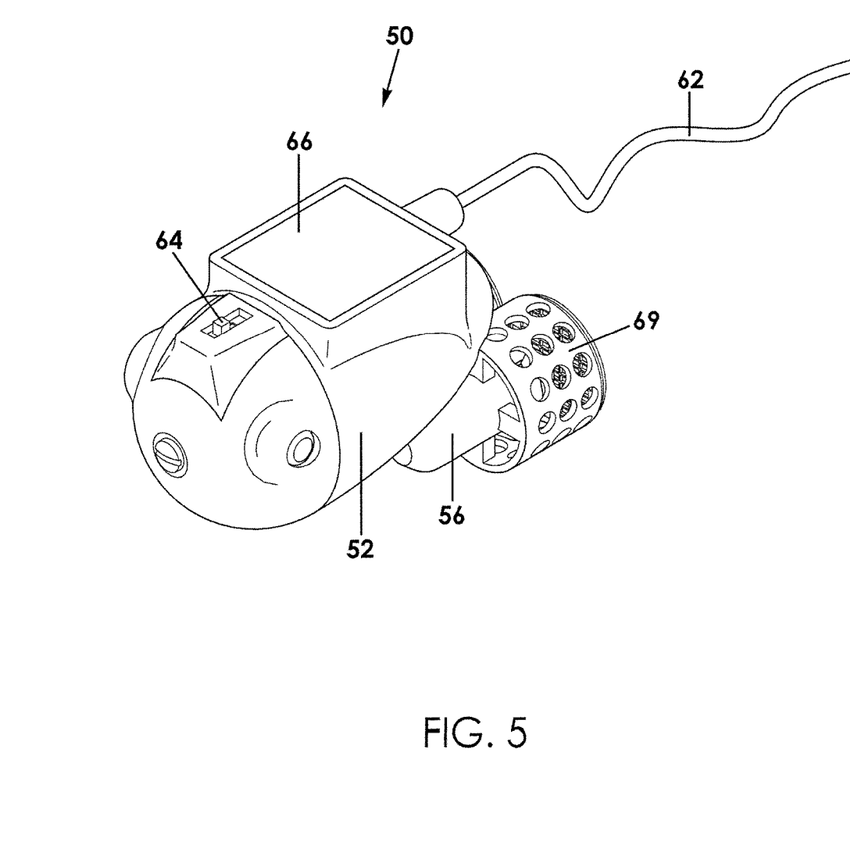
FIG. 5 is a front perspective view on an enlarged scale of a lure assembly removed from the system of FIG. 1.

The lure assembly 50 is displaced from the reel assembly 20. In other words, the lure assembly 50 is designed to be cast into the water forward of the rod 12 and reel assembly 20 in a traditional manner although the lure assembly 50 has unique features that function in a manner different from traditional lures as will be described below. The lure assembly 50 includes a lure housing 52 that defines an interior area. The lure assembly 50 includes a lure battery 54 situated in the lure housing 52 and includes at least one motor electrically connected to the lure battery 54 and that is energized by current from the lure battery 54 (FIG. 8). In an embodiment, the lure assembly 50 includes a first motor 56 and a second motor 58 configured to be independently energized. The lure assembly 50 may include propellers (not shown) associated with each motor so as to propel the lure assembly 50 through the water when the motors are energized. The propellers may be covered or shielded by mesh shield structures (FIG. 5).

A receiver 60 is situated in the lure housing 52 and is electrically connected to the lure battery 54 (FIG. 8). The receiver 60 is configured to receive a signal, such as a radio signal. Additional circuitry may be included such that the receiver 60 is configured to energize one or both motors as will be described later. The lure assembly 50 also includes an activation switch 64 in electrical communication with the lure battery 54 and is configured to selectively toggle the lure battery 54 between on and off states.

Figure 4:
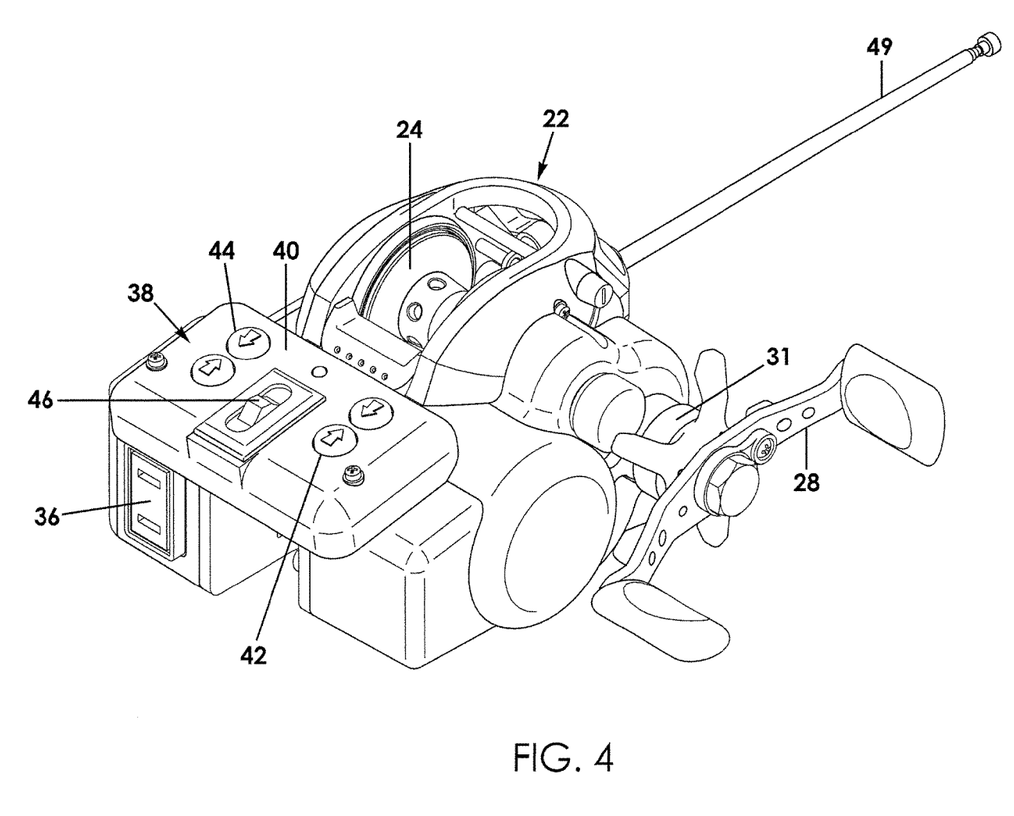
FIG. 4 is a rear perspective view of the reel assembly as in FIG. 3.

The reel assembly 20 includes a lure control module 38 attached to a top of the reel housing 22, the lure control module 38 having a lure input device 40 that is configured to receive a user input indicative of a desired movement of the lure assembly 50. More particularly, the lure input device 40 may include forward and backward buttons 42 associated with the first motor 56 and forward and backward buttons 44 associated with the second motor 58 (FIG. 4). The lure input device 40 also includes an activation switch 46 in electrical communication with the rechargeable battery 32 and is configured to selectively activate or deactivate the control buttons.

The reel assembly 20 includes a transmitter 48 electrically connected to the lure input device 40 and is configured to transmit a signal indicative of a user input, i.e. transmit a signal that defines what buttons were pushed. In operation, the transmitted signal is received by the receiver 60 of the lure assembly 50 and is then applied to actuate the first motor 56 and second motor 58, respectively.

Figure 6:
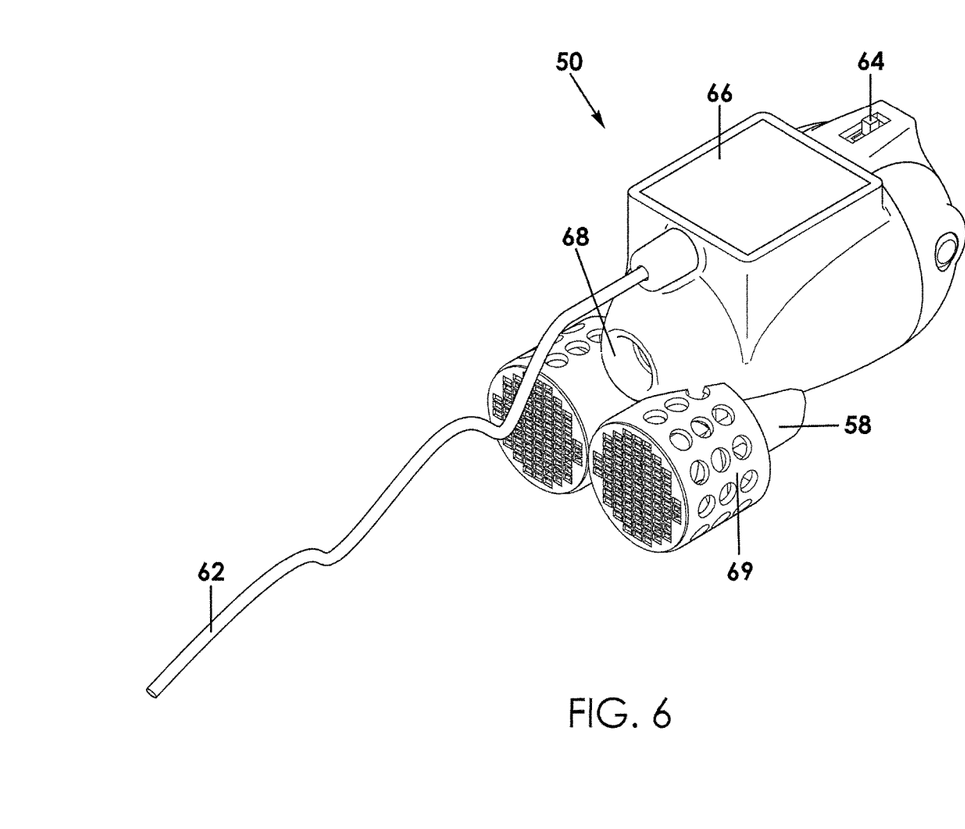
FIG. 6 is a rear perspective view of the lure assembly as in FIG. 5.

The lure assembly 50 includes a solar cell 66 coupled to the lure housing 52 and is electrically connected to the lure battery 54 (FIGS. 6 and 8). The solar cell 66 is configured to receive solar energy and to convert it to electrical current. The lure battery 54 is configured to store electrical current received from the solar cell 66.

The lure assembly 50 includes a flash jack charger input 68 in communication with the lure battery 54 and having a configuration complementary to the flash jack charger port 34 of the reel assembly 20 described previously. As such, the flash jack charger port 34 is configured to receive the flash jack charger input 68 in an electrical connection such that current from the rechargeable battery 32 of the reel assembly 20 is selectively transferred to the lure battery 54.

The reel assembly 20 includes a transmission antenna 49 electrically connected to the transmitter 48 and is configured to enhance the quality and distance of the signal emitted by the transmitter. The transmission antenna 49 may be coupled to an outer surface of the reel housing 22 and extends away therefrom. Similarly, the lure assembly 50 includes a reception antenna 62 electrically connected to the receiver 60 and is configured to enhance the quality of the signal received by the receiver 60. In an embodiment, electronic components related to sonar, cameras & audio sounds (such as bait/cricket sounds) may be included with the lure assembly 20.

Figure 1:
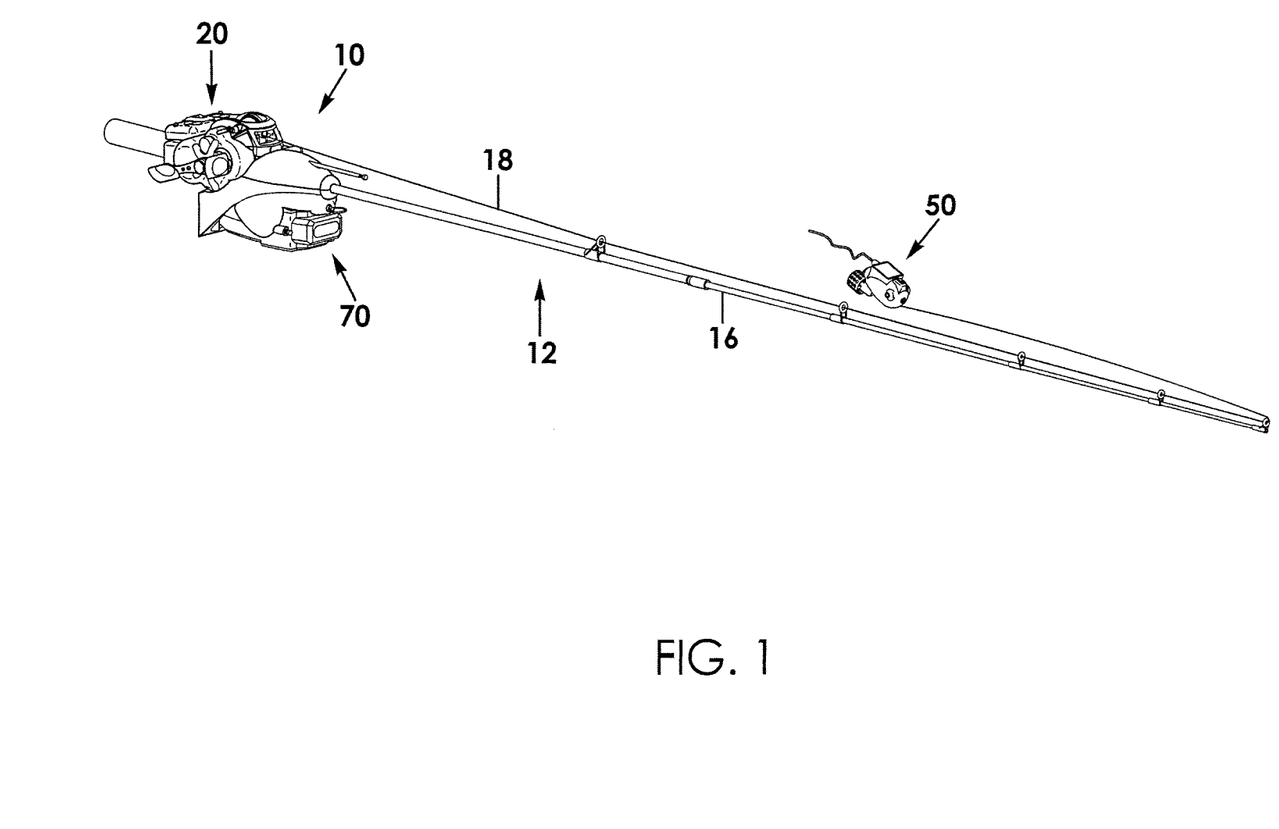
FIG. 1 is a perspective view of a power generating fishing reel and remote control lure system according to a preferred embodiment of the present invention.
Figure 2:
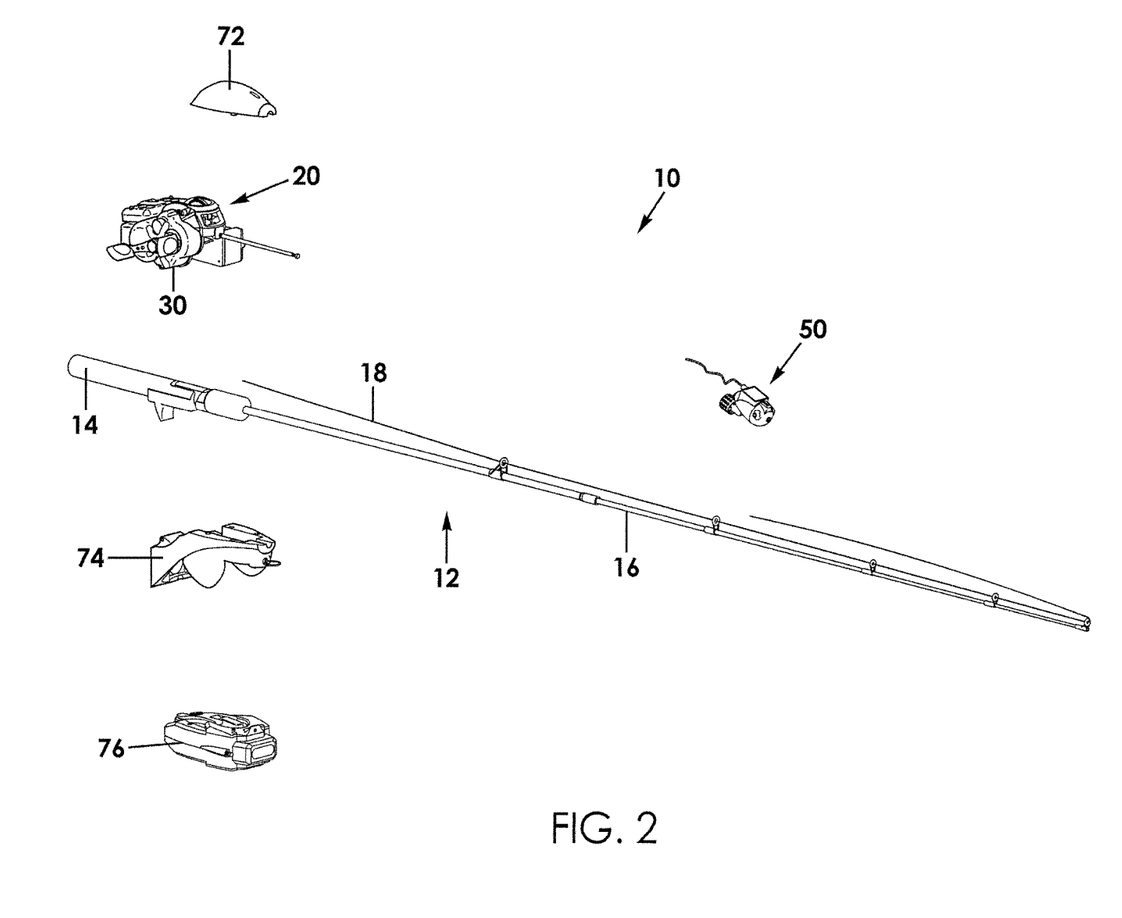
FIG. 2 is an exploded view of the system as in FIG. 1.

The safety tool assembly 70 includes an upper frame portion 72 and a lower frame portion 74 and a case 76. The upper frame portion 72 is releasably coupled to the lower frame portion 74. Together, the upper frame portion 72 and lower frame portion 74 are configured to selectively sandwich the handle 14 of the fishing rod 12 such that the safety tool assembly 70 may be selectively coupled to or removed from the rod 12 (FIGS. 1 and 2). The upper frame portion 72 and lower frame portion 74 may be referred to collectively as the "frame portion."

Figure 9:
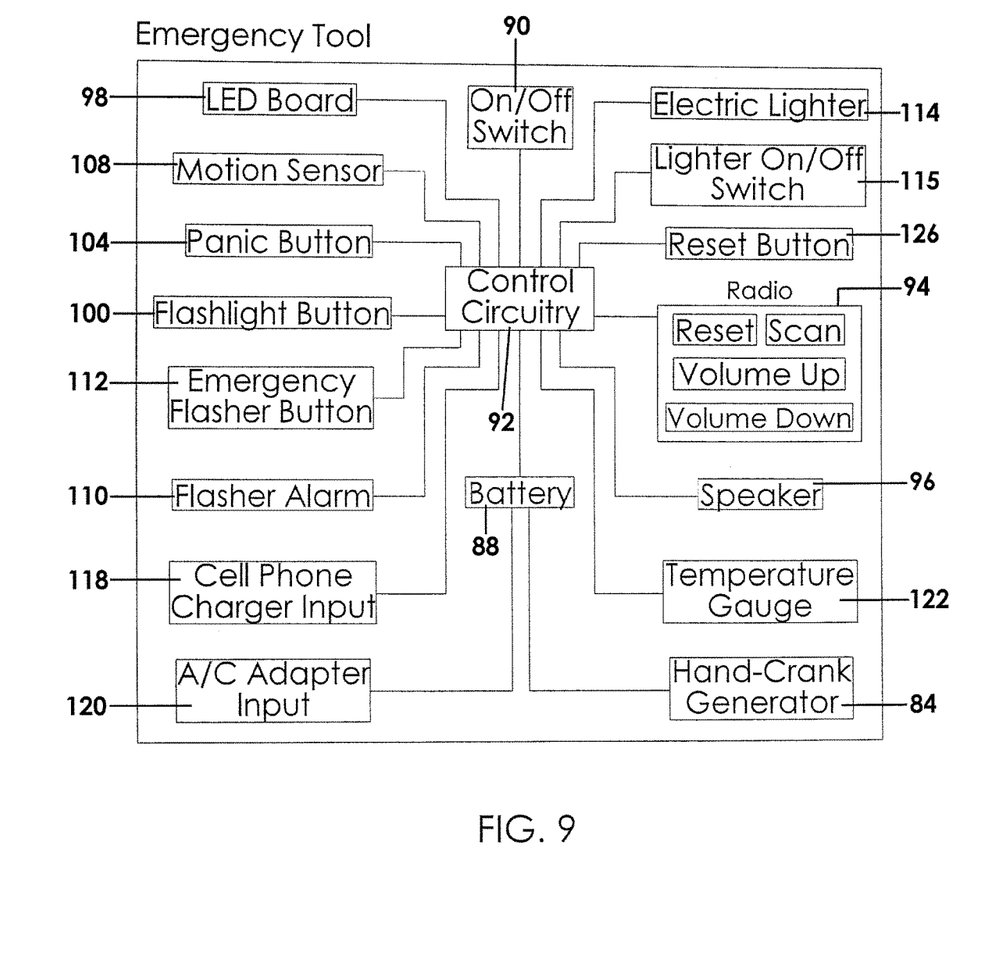
FIG. 9 is a block diagram illustrating the electronic components of the safety tool assembly.

The case 76 is removably coupled to the lower frame portion 74 (FIGS. 1 and 2). The case 76 includes a front side 78 (FIG. 7*a*) and a back side 80 (FIG. 7*b*) and respective side walls 82 extending therebetween. The case 76 defines an interior space configured to hold several emergency components as will be described below. The safety tool assembly 70 includes an auxiliary electrical generator 84 situated in the interior space of the case 76 and is configured to generate electrical current when actuated. A manual crank handle 86 is rotatably coupled to the back side 80 of the case 76 (FIG. 7*b*) and is operatively coupled to the auxiliary electrical generator 84 (FIG. 9). When the crank handle 86 is operated, the auxiliary electrical generator 84 produces electricity. The safety tool assembly 70 includes an auxiliary battery 88 electrically connected to the auxiliary electrical generator 84 and is configured to receive and store the electrical current produced by the auxiliary electrical generator 84. In use, the case 76 may be removed from the frame portion and the manual crank handle 86 may be rotatably operated so as to produce electricity that may be then be utilized by other tools or to other recharge electronic devices as will be described below.

The safety tool assembly 70 may include a signaling mirror (not shown) positioned below the crank handle 86.

Figure 7A:
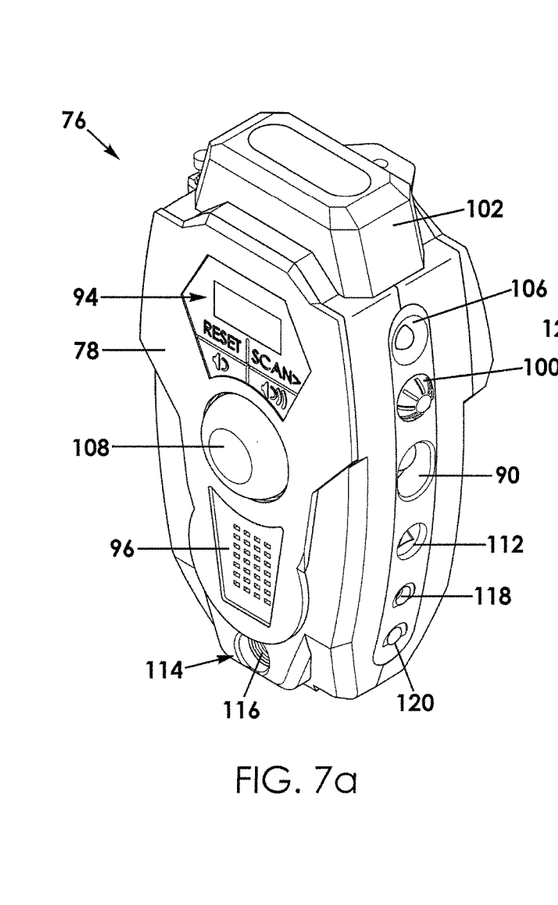
FIG. 7*a* is a front perspective view on an enlarged scale of a safety tool assembly removed from the system of FIG. 1.

The safety tool assembly 70 includes an activation switch 90 ("Radio On-OFF-Motion Sensor On switch") in electrical connection with the auxiliary battery 88 such that a user can select if the safety tool assembly 70 is activated or deactivated. The activation switch 90 may be positioned on a side wall 82 of the case 76 (FIG. 7*a*). The safety tool assembly 70 may include additional control circuitry 92 or a processor to provide the desired functionality to the features and components discuss below.

The safety tool assembly 70 includes a radio 94 situated within the case 76 and electrically connected to the auxiliary battery 88. It is understood that the radio 94 may include electronic components known to receive radio signals and may include traditional controls such as an LCD screen, buttons, dials, volume controls, and the like. In some embodiments, the radio 94 may include only weather related channels or, in other embodiments, may be tuned to receive signals from other stations even satellite radio. The radio may include its own antenna. A speaker 96 is operatively connected to the auxiliary battery 88 and to the radio 94, the speaker 96 being configured to audibly emit received radio signals.

The safety tool assembly 70 includes a light member 98 electrically connected to the auxiliary battery 88 and configured to emit light from the case 76 when energized. The light member 98 may include one or more light bulbs or light emitting diodes ("LED's") which are advantageous in that LED's require very little power and last for a relatively long time before needing to be replaced. The light member 98 and auxiliary battery 88 may be electrically connected to a light activation button 100 situated on a side wall 82 of the case 76, whereby the light member 98 may be energized or de-energized. Preferably, the light member 98 is positioned atop the case 76 such that, when energized, the light member 98 acts in the manner of a flashlight.

Figure 7B:
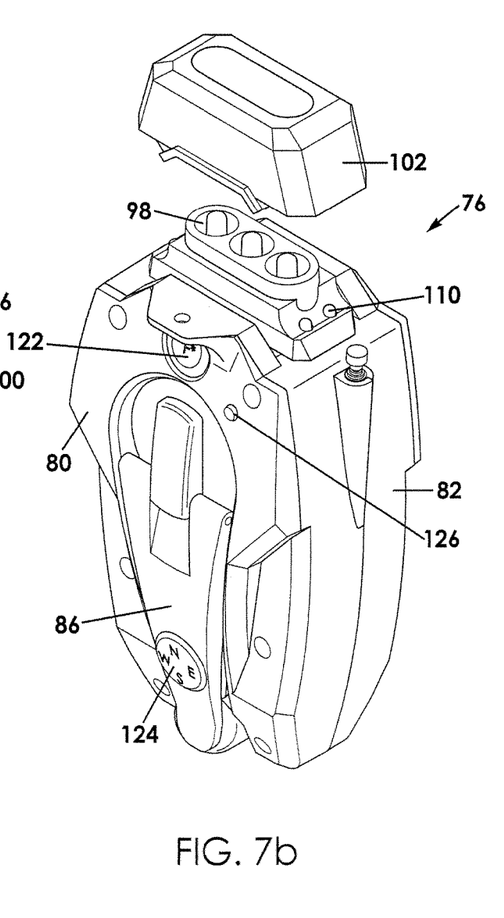
FIG. 7*b* is a rear perspective view of the safety tool assembly as in FIG. 7*a;*

A lens/light cover 102 having a translucent configuration or having a partial opening may be mounted atop the light member 98 and configured to focus or filter light from the light member 98 (FIG. 7*b*). Preferably, the light cover 102 may be colored around the outer edges (flasher alarm lights/LEDs may flash red) while the center may be translucent or transparent. In other words, the lights are configured to flash red when the flasher alarm is active while the light shines transparent when the flashlight is activated.

The safety tool assembly 70 may include an alarm 104 electrically connected to the auxiliary battery 88 (FIG. 9). The alarm 104 may be configured to indicate an emergency condition when actuated. The alarm 104 (also referred to as a "sonic alarm"), may be activated manually by a "panic alarm" button 106 situated on a side wall 82 of the case 76 or may be activated by operation of the motion sensor 108. The alarm 104 may be electrically connected to the speaker 96 and may include a visual alarm.

In an embodiment, the safety tool assembly 70 may include a motion sensor 108 and an emergency flasher alarm 110, each being electrically connected to the auxiliary battery 88. The emergency flasher alarm 110 may include an audible and/or visual alarm and may be activated manually with an emergency button 112 or upon detection of motion by the motion sensor 108. In use, the case 76 may be separated from the frame portion and rod 12 and positioned remotely, such as at a camp site where motion detection may indicate the presence of an intruder or the like.

The safety tool assembly 70 may include an electric lighter device 114 electrically connected to the auxiliary battery 88, the electric lighter device 114 being selectively operated with a lighter on/off switch 115 (FIGS. 7*a* and 9). The electric lighter device 114 includes a coil 116 that heats up when energized and is, as a result, capable of igniting an article in contact with the coil 116, such as a cigarette or kindling to build a fire.

Further, the safety tool assembly 70 may include an auxiliary charging port 118 in electrical communication with the auxiliary battery 88 (FIGS. 7*a* and 9). The auxiliary charging port 120 may be accessible through a side wall 82 of the case 76 and enables electronic devices, such as a cell phone, to be recharged from current stored in the auxiliary battery 88 or generator.

Similarly, the safety tool assembly 70 may include an AC current adapter port 120 in electrical communication with the auxiliary battery 88 (FIGS. 7*a* and 9). The AC current adapter port 120 may be accessible through a side wall 82 of the case 76 and enables the auxiliary battery 88 to receive DC current from a AC power source adapter.

In an embodiment, the safety tool assembly 70 may include a temperature gauge 122 that is configured to measure an air temperature and to display the measured temperature (FIGS. 7*b* and 9). In an embodiment, the safety tool assembly 70 may include a directional compass 124 that is configured to indicate a direction, such as north, south, east, or west (FIG. 7*b*). The circuitry of the safety tool assembly 70 may include a reset button 126 configured to reset one or all of the electronic components.

In use, the power generating fishing reel and remote control lure system 10 may be coupled to a fishing rod 12 in order to provide enhanced functionality and convenience to a fishing experience. For instance, the crank handle 14 may be operated to reel in a fishing line following the casting of a lure into the water—this winding action also actuating the electrical generator 30 to generate electrical current. Further, the lure assembly 50 may be used with the reel assembly 20 to provide enhanced control over the location of a fishing lure under or on a water surface. Lure controls situated on the reel assembly 20 generate input signals to be transmitted to the lure housing and result in actuation of one or more motors to propel the lure assembly 50. In addition, the safety tool assembly 70 includes various sensors, alarms, and electronic device charging components for the safety and convenience of the fisherman.

It is understood that while certain forms of this invention have been illustrated and described, it is not limited thereto except insofar as such limitations are included in the following claims and allowable functional equivalents thereof.

The invention claimed is:

1. A power generating fishing reel and remote control lure system for use with a fishing rod having a handle, said fishing reel and lure system comprising:
   a reel assembly having a reel housing coupleable to the handle of the fishing rod defining an interior area, said reel assembly including:
      a spool rotatably situated in said interior area of said reel housing and configured to hold a fishing line, said spool being rotatably movable to reel in or out the fishing line;
      an electrical generator positioned in said interior area of said housing and configured to generate electrical current when actuated;
      a hand crank handle operatively coupled to said spool and configured to selectively actuate movement of said spool when operated, said hand crank handle operatively coupled to said electrical generator and configured to actuate said electrical generator when operated;
      a rechargeable battery situated in said interior area of said housing and electrically connected to said electrical generator, said battery configured to store current generated by said electrical generator;
   a safety tool assembly releasably coupleable to the rod, said safety tool assembly having a case defining an interior space and a frame portion configured to couple said case to the rod;
   wherein said safety tool assembly includes:
      an auxiliary electrical generator situated in said interior space of said case and configured to generate electrical current when actuated;
      a crank handle rotatably coupled to said case and operatively coupled to said auxiliary electrical generator and configured to actuate said auxiliary electrical generator when rotated; and
      an auxiliary battery situated in said interior space of said case that is configured to store electricity generated by said auxiliary electrical generator.

2. The power generating fishing reel and remote control lure system as in claim 1, wherein said safety tool assembly includes:
   a radio situated in said case and electrically connected to said auxiliary battery, said radio having user controls and configured to receive radio signals; and
   a speaker operatively connected to said auxiliary battery and to said radio, said speaker configured to audibly emit said radio signals.

3. The power generating fishing reel and remote control lure system as in claim 1, wherein said safety tool assembly includes:
   a light member positioned on an outer surface of said case and electrically connected to said auxiliary battery;
   an alarm electrically connected to said auxiliary battery and configured to indicate an emergency condition when energized.

4. The power generating fishing reel and remote control lure system as in claim 3, wherein:
   said light member is a light emitting diode; and
   said alarm is one of an audio or visual alarm.

5. The power generating fishing reel and remote control lure system as in claim 1, wherein said safety tool assembly includes an electric lighter device electrically connected to said auxiliary battery, said electric lighter device configured to ignite an article in contact therewith when energized.

6. The power generating fishing reel and remote control lure system as in claim 1, wherein said safety tool assembly includes:
   an auxiliary charging port in electrical communication with said auxiliary battery and configured to receive a cellular phone charging plug;
   an A/C current adapter port in electrical communication with said auxiliary battery.

7. The power generating fishing reel and remote control lure system as in claim 1, wherein said safety tool assembly includes:
   an alarm situated in said case and electrically connected to said auxiliary battery; and
   a motion sensor positioned on an outer surface of said case and electrically connected to said auxiliary battery and to said alarm, said motion sensor configured to actuate said alarm if motion is detected.

8. The power generating fishing reel and remote control lure system as in claim 1, wherein said safety tool assembly includes an on/off switch electrically connected to said auxiliary battery and configured to toggle said auxiliary battery between on and off states.

9. The power generating fishing reel and remote control lure system as in claim 1, wherein said safety tool assembly includes:
   a radio situated in said case and electrically connected to said auxiliary battery, said radio having user controls and configured to receive radio signals; and
   a speaker operatively connected to said auxiliary battery and to said radio, said speaker configured to audibly emit said radio signals;
   a light member positioned on an outer surface of said case and electrically connected to said auxiliary battery; and
   an alarm electrically connected to said auxiliary battery and configured to indicate an emergency condition when energized.

10. The power generating fishing reel and remote control lure system as in claim 9, wherein said safety tool assembly includes an electric lighter device electrically connected to said auxiliary battery, said electric lighter device configured to ignite an article in contact therewith when energized.

11. The power generating fishing reel and remote control lure system as in claim 10, wherein said safety tool assembly includes:
   a second alarm situated in said case and electrically connected to said auxiliary battery; and
   a motion sensor positioned on an outer surface of said case and electrically connected to said auxiliary battery and to said second alarm, said motion sensor configured to actuate said second alarm if motion is detected.

12. The power generating fishing reel and remote control lure system as in claim 1, wherein said safety tool assembly includes a light signaling tool coupled to a surface of said case.

13. The power generating fishing reel and remote control lure system as in claim 1, wherein said reel assembly includes a clutch/slip situated intermediate said generator and said spool that is configured to selectively engage or disengage said spool when said hand crank handle is operated to actuate said generator.

14. A power generating fishing reel and remote control lure system for use with a fishing rod having a handle, said fishing reel and lure system comprising:
  a reel assembly having a reel housing coupleable to the handle of the fishing rod defining an interior area, said reel assembly including:
    a spool rotatably situated in said interior area of said reel housing and configured to hold a fishing line, said spool being rotatably movable to reel in or reel out the fishing line;
    an electrical generator positioned in said interior area of said housing and configured to generate electrical current when actuated;
    a hand crank handle operatively coupled to said spool and configured to selectively actuate movement of said spool when operated, said hand crank handle operatively coupled to said electrical generator and configured to actuate said electrical generator when operated;
    a rechargeable battery situated in said interior area of said housing and electrically connected to said electrical generator, said battery configured to store current generated by said electrical generator;
  a lure assembly remote from said reel assembly having:
    a lure housing defining an interior area;
    a lure battery positioned in said lure housing;
    a motor electrically connected to said lure battery;
    a receiver positioned in said lure housing and configured to receive a signal and to selectively energize said motor according to the received signal;
  wherein said lure assembly includes a solar cell positioned on said lure housing and electrically connected to said lure battery, said lure battery being configured to store energy received from said solar cell;
  wherein:
    said reel assembly includes:
      a flash jack charger output port in electrical communication with said rechargeable battery configured to receive a charging jack of an electronic device; and
      an electric plug outlet in electrical communication with said rechargeable battery configured to receive and A/C-type power plug;
    said lure assembly includes:
      a flash jack charger input in communication with said lure battery and having a configuration complementary to said flash jack charger output port, said flash jack charger output port configured to selectively receive said flash jack charger input whereby to transfer current from said rechargeable battery of said reel assembly to said lure battery.

15. The power generating fishing reel and remote control lure system as in claim 14, wherein said reel assembly is releasably coupleable to the handle of the rod.

16. The power generating fishing reel and remote control lure system as in claim 14, wherein said reel assembly includes a lure control module having:
  a lure input device configured to receive a user input indicative of a desired movement of said lure assembly; and
  a transmitter electrically connected to said input device and configured to transmit a signal indicative of the user input.

17. The power generating fishing reel and remote control lure system as in claim 16, wherein:
  said motor includes a first motor and a second motor each electrically connected to said lure battery and to said receiver;
  said lure input device includes a forward input and a reverse input associated with said first motor;
  said lure input device includes a forward input and a reverse input associated with said second motor.

18. The power generating fishing reel and remote control lure system as in claim 16, wherein:
  said reel assembly includes a transmission antenna electrically connected to said transmitter and configured to enhance signal transmission; and
  said lure assembly includes a reception antenna electrically connected to said receiver and configured to enhance signal reception.

19. The power generating fishing reel and remote control lure system as in claim 14, wherein said lure assembly includes an activation switch electrically connected to said lure battery and configured to toggle said lure battery between on and off states.

* * * * *